US012584861B2

(12) United States Patent
Woskov

(10) Patent No.: US 12,584,861 B2
(45) Date of Patent: Mar. 24, 2026

(54) CONTINUOUS EMISSIONS MONITOR FOR DIRECTED-ENERGY BOREHOLE DRILLING

(71) Applicant: Massachusetts Institute of Technology, Cambridge, MA (US)

(72) Inventor: Paul P. Woskov, Bedford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/722,108

(22) PCT Filed: Oct. 18, 2022

(86) PCT No.: PCT/US2022/078254
§ 371 (c)(1),
(2) Date: Jun. 20, 2024

(87) PCT Pub. No.: WO2023/122371
PCT Pub. Date: Jun. 29, 2023

(65) Prior Publication Data
US 2025/0060314 A1     Feb. 20, 2025

Related U.S. Application Data

(60) Provisional application No. 63/291,744, filed on Dec. 20, 2021.

(51) Int. Cl.
*G01N 21/66*       (2006.01)
*E21B 7/15*       (2006.01)
(Continued)

(52) U.S. Cl.
CPC ............... *G01N 21/66* (2013.01); *E21B 7/15* (2013.01); *E21B 49/005* (2013.01); *G01N 21/31* (2013.01)

(58) Field of Classification Search
CPC ........ G01N 21/66; G01N 21/31; G01N 21/71; E21B 7/15; E21B 49/005; G01J 3/1804;
(Continued)

(56) References Cited

U.S. PATENT DOCUMENTS 4,090,572 A * 5/1978 Welch ....................... E21B 7/15
219/121.84
5,003,144 A 3/1991 Lindroth et al.
(Continued)

FOREIGN PATENT DOCUMENTS

JP        2009510439 A        3/2009
WO             9307453 A1        4/1993
WO        2019046689 A1        3/2019

OTHER PUBLICATIONS

Doane, "Parabolic Tapers for Overmoded Waveguides," International Journal of Infrared and Millimeter Waves, 5.5 (1984): 737-751.
(Continued)

*Primary Examiner* — Abdullahi Nur
(74) *Attorney, Agent, or Firm* — Smith Baluch LLP

(57) ABSTRACT

Apparatus and methods for monitoring emissions from a borehole to determine the composition of earthen material removed from the borehole are described. Monitoring can be done in real time as the borehole is being deepened with a millimeter-wave drilling beam. The present technology can monitor in real-time the elemental composition of the earthen materials (e.g., rock, minerals, crystals, metals, etc.) in a borehole created by a directed-energy beam that melts and vaporizes the earthen material materials in its path. Using a continuous emissions monitor (CEM) in combination with directed-energy excavation of a borehole enables rapid surveying of the subsurface for precious and commercial metals.

20 Claims, 6 Drawing Sheets

(51) Int. Cl.
*E21B 49/00* (2006.01)
*G01N 21/31* (2006.01)

(58) Field of Classification Search
CPC ........ G01J 3/443; G01J 3/0218; G01J 3/0208;
G01J 3/36
See application file for complete search history.

(56) References Cited

U.S. PATENT DOCUMENTS

| | | | |
|---|---|---|---|
| 5,671,045 A | 9/1997 | Woskov et al. | |
| 5,824,133 A | 10/1998 | Tranquilla | |
| 8,393,410 B2* | 3/2013 | Woskov | E21B 7/14 |
| | | | 175/11 |
| 9,453,373 B2 | 9/2016 | Shnell | |
| 9,890,594 B2 | 2/2018 | Hanback | |
| 10,494,870 B2 | 12/2019 | Hanback | |
| 11,028,648 B1* | 6/2021 | Araque | E21B 7/003 |
| 2002/0019524 A1 | 2/2002 | Cottrell et al. | |
| 2003/0112431 A1 | 6/2003 | Ketkar | |
| 2007/0068242 A1 | 3/2007 | Difoggio | |
| 2008/0037010 A1 | 2/2008 | Rafac | |
| 2010/0055807 A1 | 3/2010 | Srivastava et al. | |
| 2010/0181471 A1 | 7/2010 | Pop et al. | |
| 2010/0252324 A1* | 10/2010 | Woskov | E21B 7/15 |
| | | | 166/308.1 |
| 2014/0157877 A1 | 6/2014 | Abad et al. | |
| 2015/0345225 A1 | 12/2015 | Kocis | |
| 2016/0138350 A1* | 5/2016 | Havre | E21B 21/08 |
| | | | 175/25 |
| 2018/0209218 A1 | 7/2018 | Hanback et al. | |
| 2020/0048967 A1 | 2/2020 | Batarseh | |
| 2021/0164332 A1 | 6/2021 | Skinner et al. | |

OTHER PUBLICATIONS

Haas et al. "Overview of Development in Continuous Emissions Monitoring for Mixed Waste Treatment." WM'98 Conference, Tucson, AZ, (1998), 13 pages.

Hassani et al. "The development of microwave assisted machineries to break hard rocks." Proceedings of the 28th International Symposium on Automation and Robotics in Construction, Seoul, South Korea 2011, 7 pages.

International Search Report and Written Opinion in International Application No. PCT/US2022/078254 mailed Jan. 17, 2023, 13 pages.

Monchusi, "Microwave-assisted rock breaking modelling and application." CSIR Centre for Mining Innovation, Oct. 2012, 1 page.

Petrov, New Applications of Radio Electronics: Weakening Rocks with Powerful Microwaves, Radio Electronics and Telecommunications, No. 2, 2002 pp. 35-41 Russia.

Petrov, Weakening Rocks with Powerful Electromagnetic Microwave Field, INFORMOST "Radioelectronics and Telecommunications" 2002, 19 pages.

Prokopenko, "Microwave heating for emolliating and fracture of rocks." Advances in Induction and Microwave Heating of Mineral and Organic Materials. IntechOpen, 2011, 27 pages.

Salsman et al., Short-pulse microwave treatment of disseminated sulfide ores. Mineral Eng., 1996, 9, No. 1, c. 43-54.

Schaub et al., "Simple Expressions for the Design of Linear Tapers in Overmoded Corrugated Waveguides," Journal of Infrared, Millimeter, and Terahertz Waves 37 (2016): 100-110.

Walkiewicz et al., "Microwave-assisted grinding," Conference Record of the IEEE Industry Applications Society Annual Meeting, vol. 2, doi: 10.1109/IAS. 1989.96845, 1989, pp. 1528-1532.

Walkiewicz et al., "Microwave-assisted grinding." IEEE Transactions on Industry Applications 27.2 (1991): 239-243.

Woskov "A Reflected Power Isolator for a 10 kW, 28 GHz Gyrotron," Microwave Symposium Digest (IMS), 2013 IEEE MTT-S International, Seattle, WA, Jun. 2-7, 2013, 3 pages.

Woskov et al., "Drilling and Fracturing with Millimeter-Wave Directed Energy," MIT Plasma Science and Fusion Center Report, Dec. 2008, 7 pages.

Woskov et al., "Millimeter-Wave Heating, Radiometry, and Calorimetry of Granite Rock to Vaporization," Journal of Infrared, Millimeter, and Terahertz Waves 33 (2012): 82-95, 16 pages.

Woskov et al., "Millimeter-Wave Monitoring for Nuclear Waste Vitrification," Nuclear Waste Research: Siting, Technology and Treatment (2008): 75-105.

Woskov et al., "High Temperature 2-D Millimeter-Wave Radiometry of Micro Grooved Nuclear Graphite," Proceedings MRS2012 Fall Meeting, Boston, Mass., 2012, 6 pages.

Woskov et al., Millimeter-Wave Radiometer Diagnostics of Harmonic Electron Cyclotron Emission in the Levitated Dipole Experiment, Review of Scientific Instruments 81.10 (2010): 10D910, 4 pages.

Woskov et al., "Penetrating Rock with Intense Millimeter-Waves," 2014 39th International Conference on Infrared, Millimeter, and Terahertz Waves, (IRMMW-THz 2014), IEEE, 2014, 2 pages.

Woskov, et al. "Accurate and sensitive metals emissions monitoring with an atmospheric microwave-plasma having a real-time span calibration." Waste Management 20.5-6 (2000): 395-402, 10 pages.

Woskov, et al. "Spectroscopic diagnostics of an atmospheric microwave plasma for monitoring metals pollution." Review of scientific instruments 70.1 (1999): 489-492, 11 pages.

Woskov, Notch Filter Options for ITER Stray Gyrotron Radiation (2015), 1 page.

Extended European Search Report in European App. No. 22912548.9 dated Oct. 27, 2025, 8 pages.

Japanese Office Action (Decision to Grant) with translation in Japanese App. No. 2024-537003 dated Dec. 16, 2025, 4 pages.

Korean Office Action with Google translation in Korean App. No. 10-2024-7024453 dated Dec. 29, 2025, 16 pages.

* cited by examiner 240 nm Band

| Wavelength | Element |
|---|---|
| 242.795 | Gold |
| 242.949 | Tin |
| 245.008 | Polonium |
| 245.653 | Arsenic |
| 247.856 | Carbon |
| 251.6113 | Silicon |
| 253.3976 | Polonium |
| 253.5603 | Polonium |
| 253.4915 | Mercury |
| 255.801 | Polonium |

398 nm Band

| Wavelength | Element |
|---|---|
| 390.296 | Molybdenum |
| 390.5523 | Silicon |
| 390.749 | Scandium |
| 391.181 | Scandium |
| 394.4006 | Aluminum |
| 396.1520 | Aluminum |
| 396.7392 | Thorium |
| 398.799 | Ytterbium |
| 399.088 | Ytterbium |
| 402.040 | Scandium |
| 403.076 | Manganese |
| 403.2982 | Gallium |
| 403.307 | Manganese |
| 403.449 | Manganese |
| 404.414 | Phosphorus |
| 404.721 | Phosphorus |
| 405.7807 | Lead |
| 405.822 | Gadolinium |
| 405.894 | Niobium |

*FIG. 6D*

346 nm Band

| Wavelength | Element |
|---|---|
| 338.289 | Silver |
| 340.458 | Palladium |
| 341.476 | Nickle |
| 343489 | Rhodium |
| 345.188 | Rhenium |
| 345.3505 | Cobalt |
| 346.046 | Rhenium |
| 346.437 | Ytterbium |
| 346.473 | Rhenium |
| 346.620 | Cobalt |
| 346.620 | Cadmium |
| 350.917 | Terbium |
| 351.9813 | Iridium |
| 351.924 | Thallium |
| 351.960 | Zirconium |
| 352.454 | Nickle |
| 352.802 | Rhenium |
| 352.9813 | Cobalt |

*FIG. 6C*

320 nm Band

| Wavelength | Element |
|---|---|
| 312.278 | Gold |
| 318.645 | Titanium |
| 319.199 | Titanium |
| 319.992 | Titanium |
| 322.078 | Iridium |
| 323.266 | Lithium |
| 324.754 | Copper |
| 325.609 | Indium |
| 327.3962 | Copper |
| 328.068 | Silver |

*FIG. 6B*

CONTINUOUS EMISSIONS MONITOR FOR DIRECTED-ENERGY BOREHOLE DRILLING

CROSS-REFERENCE TO RELATED APPLICATIONS

The present application is a U.S. national stage filing under 35 U.S.C. § 371 of PCT/US2022/078254, filed Oct. 18, 2022, titled "Continuous Emissions Monitor for Directed-Energy Borehole Drilling," which claims a priority benefit, under 35 U.S.C. § 119(e), to U.S. Application No. 63/291,744 filed on Dec. 20, 2021, titled "Continuous Emissions Monitor for Directed-Energy Borehole Drilling," which application is incorporated herein by reference in its entirety.

GOVERNMENT SUPPORT

This invention was made with government support under DE-AR0001051 awarded by the U.S. Department of Energy. The government has certain rights in the invention.

BACKGROUND

High-power, directed-energy beams at microwave or millimeter-wave (MMW) frequencies can be used to drill boreholes in rock for geothermal energy generation and mineral extraction, among other things. These drilling beams heat rock to thousands of degrees Centigrade, causing the rock to melt and vaporize. The vaporized rock can be flushed out of the borehole and to the surface with high-pressure gas, which also prevents the borehole from collapsing.

SUMMARY

The present technology can monitor in real-time the elemental composition of the earthen materials (e.g., rock, minerals, crystals, metals, etc.) in a borehole created by a directed-energy beam that melts and vaporizes the earthen material materials in its path. The extraction/exhaust of such a high-temperature drilling process is typically at temperatures over 1000° C. and can contain small particulates and vapors that can be analyzed by a continuous emissions monitor (CEM). Using a CEM in combination with directed-energy excavation of a borehole enables rapid surveying of the subsurface for precious and commercial metals. In an implementation, CEM for directed-energy borehole penetration uses a part of the directed-energy beam to excite the extraction exhaust to make the elements detectable for identification in real-time at the borehole site.

A CEM can monitor a borehole drilled with a MMW directed-energy beam as follows. Exhaust gas created by vaporizing earthen material with the millimeter-wave directed-energy beam is directed to a plasma chamber. In the plasma chamber, the exhaust gas is heated into a plasma state, which excites the exhaust gas constituents to produce optical emissions. A spectrometer, which may be calibrated periodically, makes a spectroscopic measurement of the plasma emissions. This spectroscopic measurement is then used to determine a composition of the exhaust gas.

The plasma can be generated in the plasma chamber with a portion of MMW radiation associated with the MMW directed-energy beam. This portion of the millimeter-wave MMW radiation can be picked off from a reflection of the MMW radiation traveling to or from the borehole. Directing the exhaust gas created by vaporizing earthen material with the portion of the MMW radiation to the plasma chamber may involve flushing particulates from the borehole into a sample tube connected to the plasma chamber with a gas flow.

A CEM for monitoring the composition of earthen material in a borehole created by a millimeter-wave directed-energy beam may include a plasma chamber and a spectrometer. The plasma chamber contains a plasma that is created with a portion of the millimeter-wave radiation used to form the directed-energy beam and that heats vaporized gas and particulates exhausted from the borehole. The spectrometer, which is in electromagnetic communication with the plasma chamber, measures a spectrum of emissions from the plasma chamber. This spectrum indicates the composition of the earthen material extracted from the borehole.

The spectrometer can be a grating spectrometer configured to monitor, with a spectral resolution of 0.02 nm or finer, at least one band with a bandwidth of 20 nm and a center wavelength in a range from 200 nm to 800 nm.

The CEM may also include a mirror, disposed in the plasma chamber, to focus the portion of the MMW directed-energy beam to a spot, and a sample tube, extending into the plasma chamber, to discharge the vapor and particulates from the borehole into the plasma chamber near the spot. The CEM can also include a calibration chamber, in fluid communication with the plasma chamber, to provide a calibration sample to the plasma chamber. The CEM can further include a reflected power isolator, in electromagnetic communication with the plasma chamber, to couple the portion of the MMW radiation out of a transmission line that guides the MMW radiation to the bottom of the borehole.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF DRAWINGS

The drawings are primarily for illustrative purposes and are not intended to limit the scope of the inventive subject matter. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 6B lists spectral emissions around 320 nm for various elements that can be included in earthen material.

FIG. 6C lists spectral emissions around 346 nm for various elements that can be included in earthen material.

FIG. 6D lists spectral emissions around 398 nm for various elements that can be included in earthen material.

DETAILED DESCRIPTION

1. Millimeter-Wave Directed-Energy Drilling Systems

Figure 1:
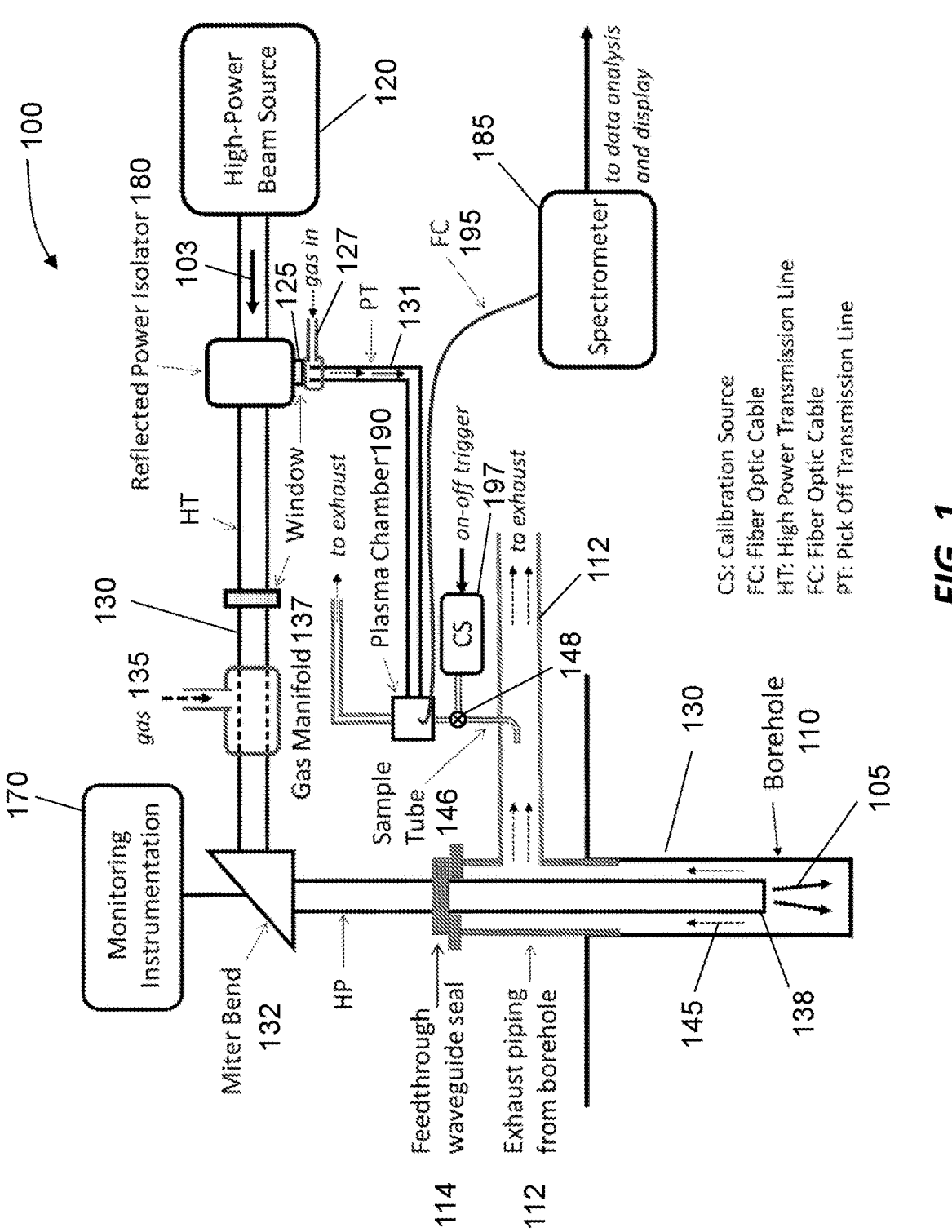
FIG. 1 illustrates a millimeter-wave (MMW) directed-energy drilling system with a continuous emissions monitor (CEM) for the borehole extraction/exhaust.

FIG. 1 shows a millimeter-wave (MMW) directed-energy drilling system 100 with a plasma chamber 190 for analyzing exhaust from a borehole 110. The system 100 includes a high-power MMW source 120, such as a gyrotron, that generates a high-power millimeter-wave radiation 103 in a frequency range of 30-300 GHz at a power level of 0.1-2.0 MW. The high-power MMW radiation is coupled into a high-power transmission line 130 or waveguide which guides this high-power MMW radiation 103 to the bottom of the borehole 110. The high-power transmission line 130 or waveguide can comprise or be formed from a conductive material, such as copper. A miter bend 132 can be used to fold the transmission line 130 and redirect the high-power MMW radiation 103 from a first direction to a second direction (e.g., from traveling horizontally to vertically down into the borehole 110. The high-power MMW drilling beam 105, when launched from the distal end of the transmission line 130, diffracts to make the borehole 110 larger in diameter than the transmission line 130 by melting and vaporizing the earthen material at the bottom of the borehole 110, creating an annular space for the extraction or exhaust of the vaporized earthen material in an exhaust flow 145.

The high-power transmission line 130 can be formed as a tube that also guides a gas 135 to the bottom of the borehole 110. At near atmospheric pressures (e.g., 15-150 psi) the gas can be air, nitrogen, hydrogen, methane, or carbon dioxide. At high pressures to the super critical fluid state (e.g., >2,000 psi), the gas 135 can be a noble gas such as argon. The gas is injected into the high-power transmission line via a transmission line gas manifold 137. The injected gas 135 is transparent to millimeter-wave radiation 130 and is at sufficient pressure and velocity to prevent arcing. The gas flushes vapor and small particulates (e.g., of less 10 μm in diameter) of the vaporized earthen material out of the annular space surrounding the distal end 138 of the high-power transmission line 130 as an exhaust flow 145.

The borehole 110 is capped by exhaust piping 112 and a feedthrough waveguide seal 114. The feedthrough waveguide seal 114 seals the borehole 110 and directs the exhaust flow 145 through the exhaust piping 112. Leading from the borehole 110, a sample tube 146 made of a metal or ceramic, such as Inconel or alumina, that can survive in the hot exhaust environment (e.g., temperatures of at least 800° C. or at least 1000° C.) is inserted into the exhaust piping 112 to divert a part of the exhaust flow 145 as a slip stream to the plasma chamber 190. The sample tube 146 may be close to the borehole 110 or located some distance from the borehole to allow the gases to cool if desired. The sample tube 146 can connect to a sample port on the plasma chamber 190 to allow gas flow into the plasma chamber. The exhaust slip stream flow to the plasma chamber 190 may be in the range of 5-25 ml/min. The exhaust slip stream can be less than 0.01%, 0.001%, or even 0.0001% of the total exhaust flow, which may be greater than 1000 scfh (470 L/min). The exhaust slip stream can be but does not need to be a homogeneous or uniform sample of the total exhaust flow to find a potentially commercial valuable resource deposit.

As exhaust gas and particulates from the slip stream enter the plasma chamber 190, they are ionized and heated by the MMW radiation to form a plasma. A portion of the MMW radiation 103 can be picked off (e.g., with a power coupler) and directed to the plasma chamber 190 to break down, heat, and vaporize the particulates in the slip stream and excite the resulting gas. In some cases, the picked off radiation can excite gas injected into the plasma chamber through a gas purge inlet 127. The strong electric field from the focused MMW radiation 103 can ionize gas molecules and accelerate electrons to excite the gas in the plasma chamber 190. The excitation of the gas into a plasma can produce optical emissions for spectroscopic measurement, analysis, and determination of components in the exhaust flow 145.

The portion (e.g., approximately 1-3 kW) of the high-power MMW radiation 103 is guided to the plasma chamber 190 by a pick-off transmission line 131. In some implementations, a reflected power isolator 180 can be inserted along the high-power transmission line 130, as shown in FIG. 1, to pick off power reflected back from the melt target at the bottom of the borehole 110. A window seal 125 and gas purge inlet 127 at or near the interface between the reflected power isolator 180 and the pick-off transmission line 131 prevent plasma propagation from the plasma chamber 190 into the high-power transmission line 130.

A spectrometer 185 analyzes the optical emissions from the plasma in the plasma chamber 190 to provide an indication of the elemental composition of the vaporized earthen material from the borehole 110. A fiber optic cable 195 transmits infrared (IR), visible, and/or ultraviolet (UV) light emitted by the plasma from the plasma chamber 190 to the spectrometer 185. The spectrometer resolves the emissions spectrum finely enough and with sufficient sensitivity to determine the elemental composition of the vaporized earthen material with a sensitivity of better than 10 μg/m³.

The plasma chamber 190 and spectrometer 185 can be calibrated with a calibration source 197 that is connected to the sample tube 146. The calibration source 197 injects, on command, a known concentration of the elements of interest to provide a span signal for calibration of the elemental concentrations in the exhaust flow 145 from the borehole 110. During calibration, the exhaust flow 145 may or may not be valved off from the plasma chamber with a control valve 148 in the sample tube 146. Alternatively, the control valve 148 may or may not be used to valve off gas from the calibration source. In some cases, the control valve 148 may not be included in the system. Elements of interest include but are not limited to commercially valuable metals, such as copper, nickel, or lithium, and precious metals, such as gold, platinum, or silver. Calibration can be performed periodically or on demand, in real-time, to account for the potentially changing composition of the exhaust flow 145 due to the different rock layer chemistries, for example, being penetrated by the high-power millimeter-wave drilling beam 105 as it deepens the borehole 110. The change in earthen material layer chemistry can affect the plasma efficiency for atomic emission excitation by changing the plasma electron temperature and density, which in turn can change the electron-atomic excitation efficiencies.

Optional monitoring instrumentation 170 coupled to the miter bend 132 may monitor the depth and/or rate of penetration of the borehole 110 with a small-signal monitoring signal (not shown) that co-propagates with the high-power millimeter-wave radiation 103 along the high-power transmission line 130. The monitoring signal may be pulsed, chirped, or at constant frequency and can be at a different frequency than the high-power millimeter-wave radiation 103. The monitoring signal can reflect off the rock face or material at the bottom of the borehole 110. This reflection propagates back up the high-power transmission line 130 to the monitoring instrumentation 170, which senses interference of the reflection with a local oscillator. The interference can be used to derive the depth and/or the rate of penetration of the borehole 110. Further details of monitoring instrumentation can be found in U.S. Application No. 63/291,731 filed on Dec. 20, 2021, Application No. PCT/US2022/0788255, titled "Rate of Penetration/Depth Monitor for a Millimeter-Wave Beam Made Hole," and in its corresponding, contemporaneously filed, non-provisional International Application, titled "Rate of Penetration/Depth Monitor for a Borehole formed with Millimeter-Wave Beam,", both of which applications are incorporated herein by reference in their entirety.

2. Plasma Chamber

Figure 2:
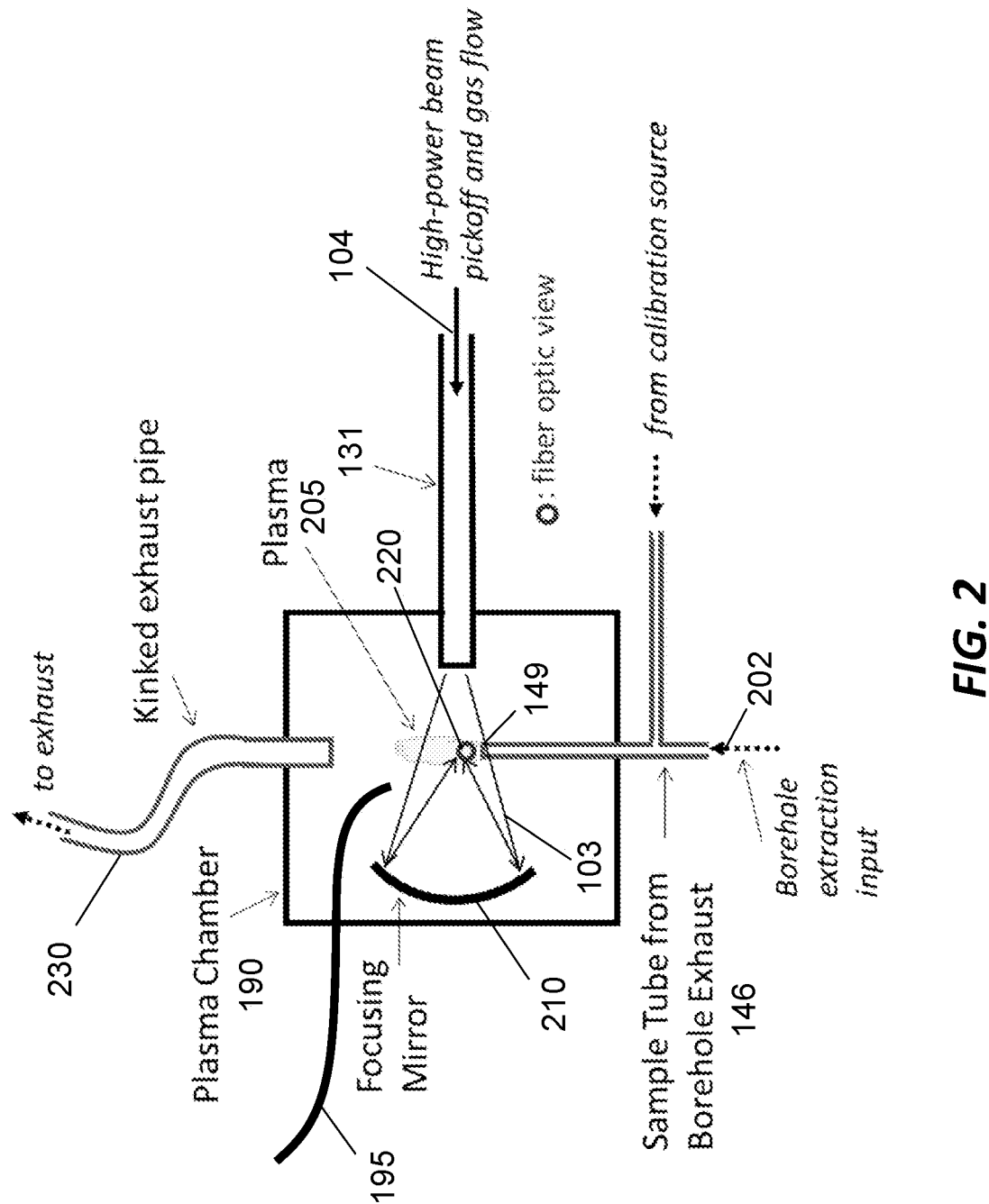
FIG. 2 shows a plasma chamber for exciting atomic emission of a part of the borehole extraction/exhaust using power picked off from the main directed energy drilling beam in the system of FIG. 1.

FIG. 2 shows the plasma chamber 190 in greater detail. The plasma chamber 190 is a gas-tight and millimeter-wave power-leakage-tight enclosure into which the pick-off portion 104 of the high-power MMW radiation 103 and exhaust slip stream 202 are introduced. The millimeter-wave radiation 103 is launched into the free space of the plasma chamber 190 toward a focusing mirror 210 that focuses the MMW radiation 103 into a diffraction-limited spot 220 that is about 2-4 wavelengths across. This increases the electric field strength at the spot 220 to about 10 kV/cm or higher to generate and sustain the plasma 205.

The sample tube 146 runs partway through the plasma chamber 190. Its output aperture 149 is at the approximate edge of the focused spot 220 formed by the MMW radiation 103 after reflecting from the focusing mirror 210. The exhaust gas slip stream 202 exits the sample tube 146 into the focused spot 220, where the focused MMW radiation 103 and plasma 205 (once present) can heat the exhaust slip stream 202. The heating can facilitate breakdown of particulates if present in the slip stream 202. The heated exhaust can also act as a thermal electron emitter to anchor the plasma 205 to the slip stream 202 at the focal spot 220. A starting spark from a Tesla coil or antenna wire may be used to initiate breakdown from a cold start.

The fiber optic cable 195 is introduced through a small hole in the plasma chamber 190 to view the plasma 205 and transmit IR, visible, and/or UV optical emissions to the spectrometer 185 for analysis.

An output exhaust pipe 230 directs the gas from the plasma chamber 190 to a finial exhaust. The output exhaust pipe 230 is maintained at a pressure slightly lower than the gas inputs from the sample tube 146 and pick-off transmission line 131. The output exhaust pipe 230 is also kinked to induce millimeter-wave mode conversion and is made of a millimeter-wave opaque dielectric and/or a metal with poor electrical conductivity to absorb higher-order modes efficiently. The kinking and use of absorbing material reduces or prevents millimeter-wave power from propagating into the environment from the plasma chamber 190.

3. Calibration Source

Figure 3:
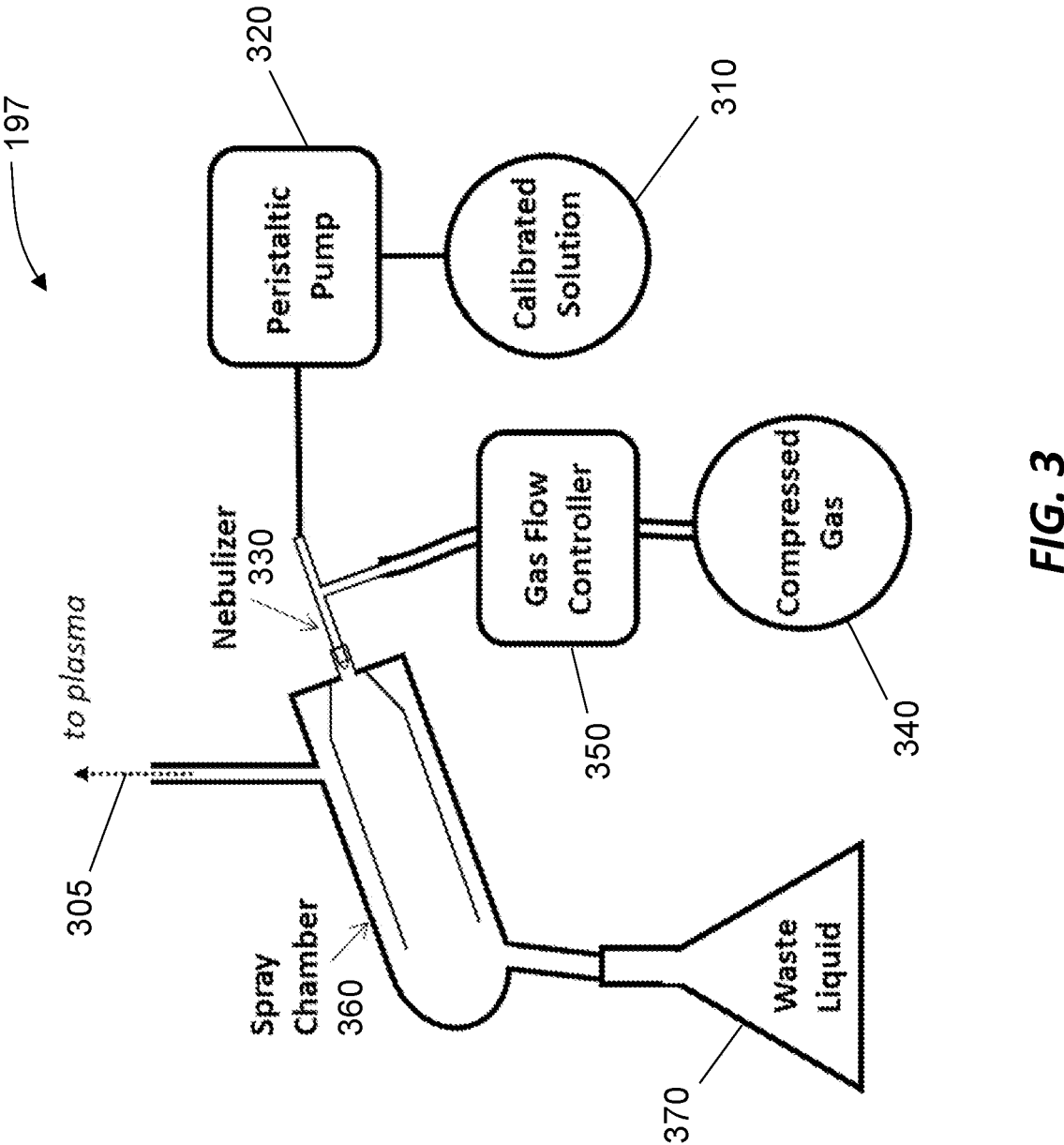
FIG. 3 shows a calibration source that can be coupled to the plasma chamber in FIG. 2.

FIG. 3 shows an example of the calibration source 197 for quantitively monitoring the concentration of elements in the borehole exhaust flow 145 in greater detail. The calibration source 197 periodically introduces into the exhaust slip stream 202 an aerosol 305 with a known concentration, e.g., 100 μg/m³, of the elements being monitored to provide a span calibration coincident with the unknown atomic emission levels.

The calibration source 197 can produce the aerosol 305 as follows. A calibrated standard solution 310 of the elements to be monitored, e.g., with a concentration of 200 μg/ml of each element in a weak acid solution, is pumped by a peristaltic pump 320 at a nominal rate of about 1 ml/min. to a nebulizer 330 (e.g., a Mienhard nebulizer). The nebulizer 330 is operated with a flow of compressed gas (e.g., nitrogen at a flow rate of about 1 l/min) from a cylinder 340 or other source and a gas flow controller 350. The nebulizer 330 converts the liquid standard solution 310 into an aerosol that is filtered of large droplets by a spray chamber 360. The filtered large droplet liquid is collected in a waste liquid container 370 that is attached to the spray chamber 360 by a sealed connection.

The concentration of the standard solution elements injected into the exhaust slip stream 202 should be accurately known for quantitative monitoring. The concentration C can be determined by the formula:

$$C = \varepsilon \frac{XR}{F}, \tag{1}$$

where ε is the efficiency of the nebulizer 330, X is the concentration of the calibrated solution 310, R is the rate of solution pumped into the sample tube 146 and exhaust slip stream 202, and F is the flow rate of the slip stream 202 from the output aperture 149 of the sample tube 146 into the plasma 205. The standard solution concentration is known, the rate of solution pumped is controlled, the sample exhaust flow can be measured, and the efficiency of the specific nebulizer model can be determined independently. Accordingly, the concentration C can be found from Eq. 1.

4. Spectrometer

Atomic emission from neutral atoms rather than ionized atoms may dominate the emissions spectrum from an atmospheric pressure plasma with a typical electron temperature less than 1 eV because local thermodynamic equilibrium suppresses the number of high-energy electrons that can ionize atoms. TABLE 1 lists some of the prominent neutral atomic emission wavelengths in air for metals and rare earths in the UV-optical wavelength range. A spectrometer 185 having fine resolution for these wavelengths can be used in order to distinguish among the species in the plasma. A spectral resolution of better than 0.05 nm is desirable over the emissions spectral range. The spectrometer 185 can also have a broad spectral range to cover as many elements as possible.

TABLE 1

| Prominent UV-Optical Atomic Emission Wavelengths for Metals and Rare Earths | | | | |
|---|---|---|---|---|
| Element | Symbol | Wavelength 1 (nm) | Wavelength 2 (nm) | Wavelength 3 (nm) |
| Aluminum | Al | 396.1520 | 394.4006 | 309.2713 |
| Arsenic | As | 234.984 | 228.812 | 245.653 |

TABLE 1-continued

| | | Prominent UV-Optical Atomic Emission Wavelengths for Metals and Rare Earths | | |
|---|---|---|---|---|
| Element | Symbol | Wavelength 1 (nm) | Wavelength 2 (nm) | Wavelength 3 (nm) |
| Barium | Ba | 553.5551 | 577.7665 | 551.9115 |
| Beryllium | Be | 234.8610 | 332.1343 | 332.1086 |
| Bismuth | Bi | 306.7716 | 289.7975 | 472.2552 |
| Cadmium | Cd | 228.8018 | 298.0620 | 346.620 |
| Calcium | Ca | 422.6728 | 445.4478 | 487.813 |
| Carbon | C | 247.856 | 477.175 | 538.034 |
| Cerium | Ce | 515.969 | 516.148 | 522.346 |
| Cesium | Cs | 455.528 | 459.317 | 387.615 |
| Chromium | Cr | 425.4346 | 427.4803 | 520.8436 |
| Cobalt | Co | 345.3505 | 346.580 | 352.9813 |
| Copper | Cu | 324.7540 | 327.3962 | 521.8202 |
| Gadolinium | Gd | 378.305 | 405.822 | 407.844 |
| Gallium | Ga | 417.2056 | 403.2982 | 294.3637 |
| Gold | Au | 242.795 | 267.595 | 312.278 |
| Hafnium | Hf | 286.637 | 294.077 | 368.224 |
| Indium | In | 451.1323 | 410.1773 | 325.609 |
| Iridium | Ir | 322.0780 | 351.3645 | 292.479 |
| Iron | Fe | 371.9935 | 373.7133 | 374.5564 |
| Lanthanum | La | 521.186 | 517.731 | 523.427 |
| Lead | Pb | 283.3053 | 368.3456 | 405.7807 |
| Lithium | Li | 670.791 | 610.354 | 323.266 |
| Lutetium | Lu | 335.956 | 328.174 | 451.857 |
| Magnesium | Mg | 285.213 | 279.553 | 383.829 |
| Manganese | Mn | 403.076 | 403.307 | 403.449 |
| Mercury | Hg | 253.6506 | 365.0157 | 435.8337 |
| Molybdenum | Mo | 379.825 | 386.411 | 390.296 |
| Neodymium | Nd | 463.424 | 464.110 | 468.345 |
| Nickle | Ni | 341.476 | 352.454 | 361.939 |
| Niobium | Nb | 405.894 | 407.971 | 410.092 |
| Osmium | Os | 201.814 | 202.026 | 290.906 |
| Palladium | Pd | 340.458 | 360.955 | 363.470 |
| Phosphorus | P | 253.5603 | 253.3976 | 255.4915 |
| Platinum | Pt | 204.937 | 208.459 | 265.945 |
| Polonium | Po | 300.321 | 255.801 | 245.008 |
| Potassium | K | 766.490 | 404.414 | 404.721 |
| Praseodymium | Pr | 495.137 | 493.974 | 469.577 |
| Promethium | Pm | 462.441 | 459.755 | 465.052 |
| Radium | Ra | 482.591 | 566.081 | |
| Rhenium | Re | 346.046 | 346.473 | 345.188 |
| Rhodium | Rh | 369.236 | 352.802 | 343.489 |
| Rubidium | Rb | 780.027 | 420.180 | 421.553 |
| Ruthenium | Ru | 419.990 | 421.206 | 408.060 |
| Samarium | Sm | 374.546 | 375.641 | 383.448 |
| Scandium | Sc | 391.181 | 390.749 | 402.040 |
| Silicon | Si | 288.2579 | 251.6113 | 390.5523 |
| Silver | Ag | 328.068 | 338.289 | |
| Sodium | Na | 588.9950 | 589.5924 | |
| Strontium | Sr | 460.733 | 407.771 | 421.552 |
| Sulfur | S | 792.40 | 605.27 | 412.08 |
| Tantalum | Ta | 271.467 | 265.327 | 265.661 |
| Technetium | Tc | 429.706 | 426.227 | 485.359 |
| Tellurium | Te | 200.202 | 214.841 | 238.578 |
| Terbium | Tb | 350.917 | 370.286 | 356.852 |
| Thallium | Tl | 351.924 | 535.046 | 377.572 |
| Thorium | Th | 383.8384 | 389.5419 | 396.7392 |
| Thulium | Tm | 409.419 | 410.584 | 418.762 |
| Tin | Sn | 283.999 | 235.484 | 242.949 |
| Titanium | Ti | 319.992 | 319.199 | 318.645 |
| Tungsten | W | 272.435 | 294.440 | 294.699 |
| Uranium | U | 385.957 | 358.488 | 367.007 |
| Vanadium | V | 437.924 | 438.472 | 440.851 |
| Ytterbium | Yb | 398.799 | 346.437 | 399.088 |
| Yttrium | Y | 410.238 | 412.831 | 414.285 |
| Zinc | Zn | 330.258 | 334.502 | 213.856 |
| Zirconium | Zr | 360.119 | 351.960 | 383.596 |

Figure 4:
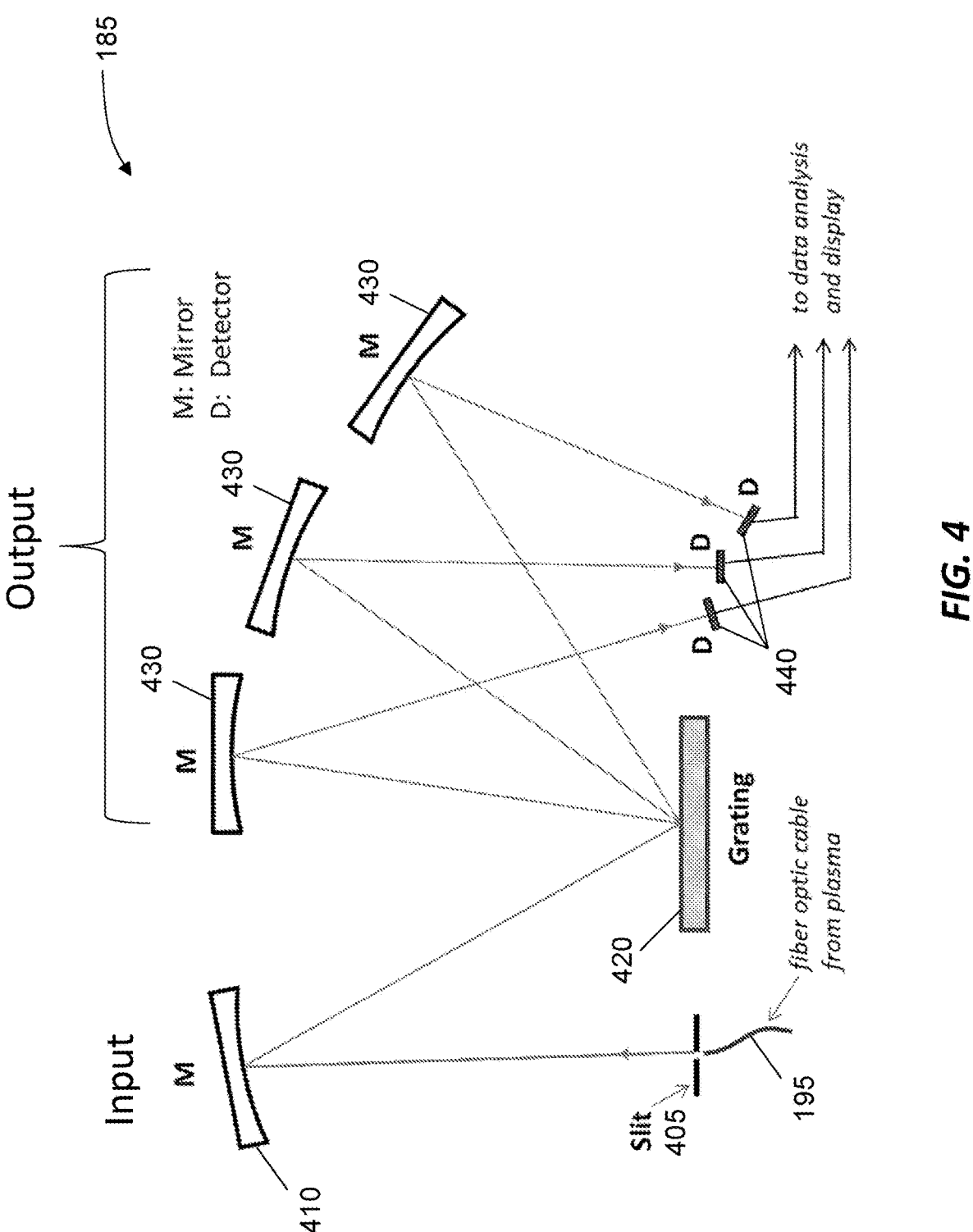
FIG. 4 shows a grating spectrometer for monitoring the atomic emission from many elements simultaneously with fine spectral resolution.

FIG. 4 illustrates a spectrometer 185 that monitors the emissions from many elements in the exhaust slip stream 202 (FIG. 2) with fine spectral resolution. The spectrometer 185 includes an entrance slit 405, a concave input mirror 410, a grating 420, several concave output mirrors 430, and several linear detector arrays 440. (Similar performance can be achieved with many small spectrometers with narrow wavelength ranges.) FIG. 4 shows three concave output mirrors 430 and linear detector arrays 440, but other spectrometers may have more or fewer concave output mirrors and linear detector arrays.

The fiber optic cable 195 guides the plasma emissions to the entrance slit 405, which may be about 10 nm wide and is located at the focal point of the concave input mirror 410. The concave input mirror 410 images the light transmitted through the slit 405 onto the grating 420, which diffracts the different spectral components at angles proportional to their wavelengths. The concave output mirrors 430 are distributed at different angles in the diffraction pattern and focus different portions of the diffracted light from the grating onto respective linear detector arrays 440. In FIG. 4, there is one linear detector array 440 for each concave output mirror 430. Each detector array 440 monitors the wavelength range intercepted by the corresponding concave output mirror 430. In other implementations, one linear detector array or one two-dimensional detector array may be used to record emissions reflected from all output mirrors 430. The detector arrays 440 are connected to a computer, processor, and/or other signal processing electronics (not shown) for signal analysis, data storage, and/or display.

The grating spectrometer's dimensions, angles, wavelength resolution, and detector array bandwidths can be determined by the three equations below. Eq. 2 is the standard grating diffraction angle formula, Eq. 3 is the wavelength resolution formula, and Eq. 4 is the detector array bandwidth formula:

$$\theta_D = \arcsin(\lambda n - \sin\theta_i) \tag{2}$$

$$\frac{d\lambda}{dx} = \frac{2w}{nL}\cos\theta_D \tag{3}$$

$$\Delta\lambda = \frac{d\lambda}{dx}\frac{Y}{2w} \tag{4}$$

Figures 5, 6A:
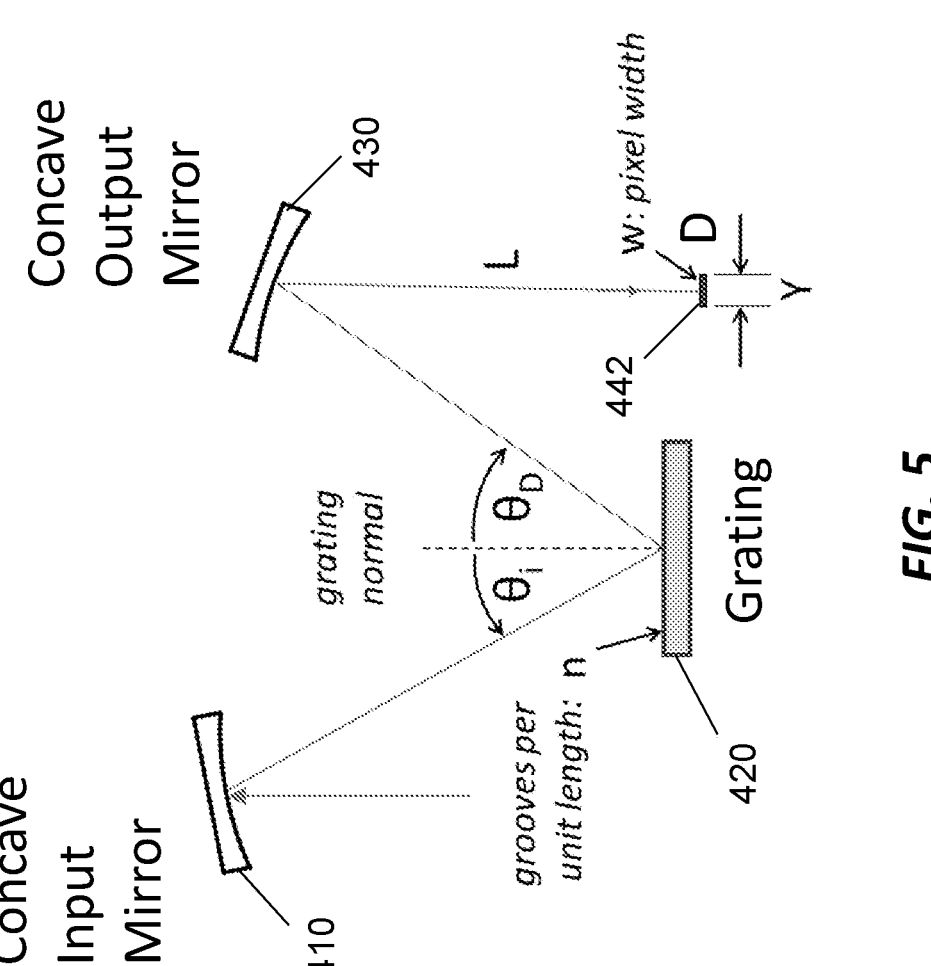
FIG. 5 illustrates parameters of a diffraction grating spectrometer.
FIG. 6A lists spectral emissions around 240 nm for various elements that can be included in earthen material.

FIG. 5 shows the parameters in Eq. 2 through Eq. 4. These parameters are defined as follows:

$\theta_D$—diffraction angle from grating 420

$\theta_i$—incident angle on grating 420

$\lambda$—wavelength n—grating groove density

L—distance from output mirror 430 to detector array 440 w—width of one sensor pixel 442 in detector array 440

Y—total length of detector array 440

TABLE 2 gives the results of calculations using Eq. 2 through Eq. 4 for a grating spectrometer 185 with a 2400 gr/mm grating groove density and four 2048-pixel linear detector arrays 440 with 14 μm wide pixels. The detector arrays 440 can monitor different bands with a spectral resolution of 0.016 nm or finer. Each band is about 16 nm wide, for this example, and has a wavelength in a range from 200 nm to 800 nm. This spectrometer can detect any of 35 elements in the exhaust slip stream including the commercially valuable metals of copper, aluminum, nickel, titanium, lithium, palladium, gold, and silver. Other spectrometers may have other numbers of bands (e.g., three, five, or six), bandwidths (e.g., 20 nm, 25 nm, 30 nm), and/or spectral resolutions (e.g., 0.1 nm, 0.2 nm, 0.3 nm, etc.) and may be able to detect different numbers and types of elements.

TABLE 2

| Diffraction Angles, Resolutions, and Bandwidths with 2400 gr/mm Grating and 2048 Pixel Linear Detector Arrays having 14 μm wide Pixels | | | | | |
|---|---|---|---|---|---|
| Center Wavelength (nm) | Incident Angle, θi (deg.) | Diffraction Angle, θD (deg.) | Length, L (mm) | Resolution (nm) | Bandwidth (nm) |
| 249 | 25 | 10.08 | 720 | 0.016 | 16.34 |
| 320 | 25 | 20.21 | 690 | 0.016 | 16.25 |
| 346 | 25 | 24.07 | 670 | 0.016 | 16.28 |
| 398 | 25 | 32.18 | 620 | 0.016 | 16.31 |

FIG. 6A through FIG. 6D list spectral emissions in four bands for various elements that can be used to detect the presence of valuable elements. FIG. 6A shows emissions for the 240 nm band, FIG. 6B shows emissions for the 320 nm band, FIG. 6C shows emissions for the 346 nm band, and FIG. 6D shows emissions for the 398 nm band. More than one wavelength can be detected for many of the elements ensuring unambiguous identification of the elements. A number of rare-earth elements are included along with silicon and carbon. Monitoring silicon concentration indicates the type of earthen material being drilled. The presence of carbon indicates that a hydrocarbon compound has been encountered. Additional channels could be added to increase the number of elements monitored. Thus, a comprehensive, rapid survey of the subsurface chemistry in the borehole 110 can be achieved while drilling the borehole with this technology.

Apparatus for continuously monitoring emissions from a borehole drilled with a millimeter-wave directed-energy drilling beam can be implemented and/or included in drilling systems in various configurations. Example configurations are listed below. Corresponding methods of monitoring emissions can also be implemented.

(1) A method of monitoring emissions from a borehole drilled with a millimeter-wave directed-energy drilling beam, the method comprising: receiving, in a plasma chamber, exhaust gas created by vaporizing earthen material with the millimeter-wave directed-energy drilling beam; in the plasma chamber, heating the exhaust gas with electromagnetic radiation to produce a plasma and optical emissions from the plasma; making a spectroscopic measurement of the optical emissions with a spectrometer; and determining a composition of the exhaust gas based on the spectroscopic measurement of the optical emissions.

(2) The method of (1), further comprising: receiving, in the plasma chamber, a portion of millimeter-wave radiation used to make the millimeter-wave directed-energy drilling beam; and focusing the portion of millimeter-wave radiation to provide the electromagnetic radiation that produces the plasma.

(3) The method of (2), further comprising picking off the portion of the millimeter-wave radiation returned from a reflection of the millimeter-wave drilling beam from a bottom of the borehole.

(4) The method of any one of (1) through (3), further comprising calibrating the spectrometer.

(5) The method of (4), wherein calibrating the spectrometer comprises: introducing an aerosol from a calibration source into the plasma chamber, wherein the aerosol supplies a known amount of an element from the calibration source to the plasma; measuring optical emission levels from the plasma while the aerosol is present in the plasma, the optical emission levels indicating an amount of the element; and determining, from the optical emission levels, an amount of the element in the exhaust gas.

(6) The method of any one of (1) through (5), wherein receiving the exhaust gas created by vaporizing earthen material comprises receiving particulates from the borehole into a sample tube connected to the plasma chamber with a gas flow.

(7) A system for monitoring the composition of earthen material in a borehole created by a millimeter-wave directed-energy drilling beam, the system comprising: a plasma chamber to receive exhaust gas from the borehole and to receive a portion of millimeter-wave radiation that is used to make the millimeter-wave drilling beam, wherein the plasma chamber is configured to heat the exhaust gas with the portion of the millimeter-wave radiation to create a plasma emitting optical emissions; and a spectrometer, in electromagnetic communication with the plasma chamber, to measure a spectrum of the optical emissions from the plasma, the spectrum indicating the composition of the earthen material in the borehole.

(8) The system of configuration (7), further comprising: a sample tube or sample port connected to the plasma chamber to receive the exhaust gas from the borehole; and an exhaust tube or exhaust port connected to the plasma chamber to exhaust at least the exhaust gas from the plasma chamber.

(9) The system of configuration (8), wherein the sample tube or sample port is made of a material to withstand temperatures of at least 800° C.

(10) The system of any one of configurations (7) through (9), wherein the spectrometer is a grating spectrometer configured to monitor, with a spectral resolution of 0.02 nm or finer, at least one band with a bandwidth of 20 nm and a center wavelength in a range from 200 nm to 800 nm.

(11) The system of any one of configurations (7) through (10), further comprising: a mirror, disposed in the plasma chamber, to focus the portion of the millimeter-wave radiation to a spot; and a sample tube, extending into the plasma chamber, to discharge the exhaust gas from the borehole into the plasma chamber near the spot.

(12) The system of configuration (11), further comprising a fiber optic cable connected to the plasma chamber and arranged to receive the optical emissions from the spot and guide the optical emissions to the spectrometer.

(13) The system of any one of configurations (7) through (12), further comprising a calibration source, in fluid communication with the plasma chamber, to provide an aerosol for calibration of the spectrometer to the plasma chamber.

(14) The system of any one of configurations (7) through (13), further comprising a reflected power isolator, in electromagnetic communication with the plasma chamber, to couple the portion of the millimeter-wave radiation out of a transmission line that guides the millimeter-wave radiation to a bottom of the borehole to form the millimeter-wave directed-energy drilling beam.

(15) A system for drilling a borehole and monitoring emissions from the borehole, the system comprising: a high-power millimeter-wave (MMW) source; a waveguide to carry MMW radiation from the MMW source to the borehole; exhaust piping to seal the borehole and capture exhaust gas from the borehole while the borehole is being deepened with a MMW drilling beam formed from the MMW radiation; a plasma chamber in fluid communication with the exhaust piping to receive an exhaust slip stream picked off from the exhaust gas; and a spectrometer in electromagnetic communication with the plasma chamber to detect emissions from a plasma formed in the plasma chamber from the exhaust slip stream.

(16) The system of configuration (15), further comprising a reflected power isolator, in electromagnetic communication with the plasma chamber, to couple a portion of the MMW radiation produced by the MMW source to the plasma chamber.

(17) The system of configuration (16), further comprising: a mirror, disposed in the plasma chamber, to focus the portion of the MMW radiation to a spot inside the plasma chamber; and a sample tube, extending into the plasma chamber, to discharge the exhaust slip stream into the plasma chamber near the spot.

(18) The system of configuration (17), further comprising a fiber optic cable connected to the plasma chamber and arranged to receive optical emissions from the spot and guide the optical emissions to the spectrometer.

(19) The system of any one of configurations (15) through (18), wherein the spectrometer is a grating spectrometer configured to monitor, with a spectral resolution of 0.02 nm or finer, at least one band with a bandwidth of 20 nm and a center wavelength in a range from 200 nm to 800 nm.

(20) The system of any one of configurations (15) through (19), further comprising a calibration source, in fluid communication with the plasma chamber, to provide an aerosol for calibration of the spectrometer to the plasma chamber.

6. Conclusion

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of monitoring emissions from a borehole drilled with a millimeter-wave directed-energy drilling beam, the method comprising:

receiving, in a plasma chamber, exhaust gas created by vaporizing earthen material with the millimeter-wave directed-energy drilling beam;

in the plasma chamber, heating the exhaust gas with electromagnetic radiation to produce a plasma and optical emissions from the plasma;

making a spectroscopic measurement of the optical emissions with a spectrometer; and determining a composition of the exhaust gas based on the spectroscopic measurement of the optical emissions.

2. The method of claim 1, further comprising:

receiving, in the plasma chamber, a portion of millimeter-wave radiation used to make the millimeter-wave directed-energy drilling beam; and focusing the portion of millimeter-wave radiation to provide the electromagnetic radiation that produces the plasma.

3. The method of claim 2, further comprising:

picking off the portion of the millimeter-wave radiation returned from a reflection of the millimeter-wave directed-energy drilling beam from a bottom of the borehole.

4. The method of claim 1, further comprising calibrating the spectrometer.

5. The method of claim 4, wherein calibrating the spectrometer comprises:

introducing an aerosol from a calibration source into the plasma chamber, wherein the aerosol supplies a known amount of an element from the calibration source to the plasma;

measuring optical emission levels from the plasma while the aerosol is present in the plasma, the optical emission levels indicating an amount of the element; and determining, from the optical emission levels, an amount of the element in the exhaust gas.

6. The method of claim 1, wherein receiving the exhaust gas created by vaporizing earthen material comprises receiving particulates from the borehole into a sample tube connected to the plasma chamber with a gas flow.

7. A system for monitoring the composition of earthen material in a borehole created by a millimeter-wave directed-energy drilling beam, the system comprising:

a plasma chamber to receive exhaust gas from the borehole and to receive a portion of millimeter-wave radiation that is used to make the millimeter-wave directed-energy drilling beam, wherein the plasma chamber is configured to heat the exhaust gas with the portion of the millimeter-wave radiation to create a plasma emitting optical emissions; and a spectrometer, in electromagnetic communication with the plasma chamber, to measure a spectrum of the optical emissions from the plasma, the spectrum indicating the composition of the earthen material in the borehole.

8. The system of claim 7, further comprising:

a sample tube or sample port connected to the plasma chamber to receive the exhaust gas from the borehole; and an exhaust tube or exhaust port connected to the plasma chamber to exhaust at least the exhaust gas from the plasma chamber.

9. The system of claim 8, wherein the sample tube or sample port is made of a material to withstand temperatures of at least 800° C.

10. The system of claim 7, wherein the spectrometer is a grating spectrometer configured to monitor, with a spectral resolution of 0.02 nm or finer, at least one band with a bandwidth of 20 nm and a center wavelength in a range from 200 nm to 800 nm.

11. The system of claim 7, further comprising:

a mirror, disposed in the plasma chamber, to focus the portion of the millimeter-wave radiation to a spot; and a sample tube, extending into the plasma chamber, to discharge the exhaust gas from the borehole into the plasma chamber near the spot.

12. The system of claim 11, further comprising:

a fiber optic cable connected to the plasma chamber and arranged to receive the optical emissions from the spot and guide the optical emissions to the spectrometer.

13. The system of claim 7, further comprising:

a calibration source, in fluid communication with the plasma chamber, to provide an aerosol for calibration of the spectrometer to the plasma chamber.

14. The system of claim 7, further comprising:

a reflected power isolator, in electromagnetic communication with the plasma chamber, to couple the portion of the millimeter-wave radiation out of a transmission line that guides the millimeter-wave radiation to a bottom of the borehole to form the millimeter-wave directed-energy drilling beam.

15. A system for drilling a borehole and monitoring emissions from the borehole, the system comprising:

a high-power millimeter-wave (MMW) source;

a waveguide to carry MMW radiation from the MMW source to the borehole;

exhaust piping to seal the borehole and capture exhaust gas from the borehole while the borehole is being deepened with a MMW drilling beam formed from the MMW radiation;

a plasma chamber in fluid communication with the exhaust piping to receive an exhaust slip stream picked off from the exhaust gas;

a spectrometer in electromagnetic communication with the plasma chamber to detect emissions from a plasma formed in the plasma chamber from the exhaust slip stream; and a reflected power isolator, in electromagnetic communication with the plasma chamber, to couple a portion of the MMW radiation produced by the MMW source to the plasma chamber.

16. The system of claim 15, further comprising:

a mirror, disposed in the plasma chamber, to focus the portion of the MMW radiation to a spot inside the plasma chamber; and a sample tube, extending into the plasma chamber, to discharge the exhaust slip stream into the plasma chamber near the spot.

17. The system of claim 16, further comprising:

a fiber optic cable connected to the plasma chamber and arranged to receive optical emissions from the spot and guide the optical emissions to the spectrometer.

18. The system of claim 15, wherein the spectrometer is a grating spectrometer configured to monitor, with a spectral resolution of 0.02 nm or finer, at least one band with a bandwidth of 20 nm and a center wavelength in a range from 200 nm to 800 nm.

19. The system of claim 15, further comprising:

a calibration source, in fluid communication with the plasma chamber, to provide an aerosol for calibration of the spectrometer to the plasma chamber.

20. A system for drilling a borehole and monitoring emissions from the borehole, the system comprising:

a high-power millimeter-wave (MMW) source;

a waveguide to carry MMW radiation from the MMW source to the borehole;

exhaust piping to seal the borehole and capture exhaust gas from the borehole while the borehole is being deepened with a MMW drilling beam formed from the MMW radiation;

a plasma chamber in fluid communication with the exhaust piping to receive an exhaust slip stream picked off from the exhaust gas;

a spectrometer in electromagnetic communication with the plasma chamber to detect emissions from a plasma formed in the plasma chamber from the exhaust slip stream; and a calibration source, in fluid communication with the plasma chamber, to provide an aerosol for calibration of the spectrometer to the plasma chamber.

* * * * *